United States Patent
Matsumura et al.

(10) Patent No.: US 10,298,166 B2
(45) Date of Patent: May 21, 2019

(54) MOTOR CONTROL SYSTEM, MOTOR CONTROLLER, AND METHOD FOR SETTING SAFETY FUNCTION

(71) Applicant: Kabushiki Kaisha Yaskawa Denki, Kitakyushu-shi (JP)

(72) Inventors: Isamu Matsumura, Kitakyushu (JP); Junya Hisamatsu, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 0 days.

(21) Appl. No.: 15/787,966

(22) Filed: Oct. 19, 2017

(65) Prior Publication Data

US 2018/0294762 A1    Oct. 11, 2018

(30) Foreign Application Priority Data

Apr. 11, 2017    (JP) ................................ 2017-078232

(51) Int. Cl.
```
H02K 7/10       (2006.01)
H02P 29/024     (2016.01)
G05B 19/406     (2006.01)
G05B 19/4062    (2006.01)
G05B 19/4063    (2006.01)
G05B 9/02       (2006.01)
H02P 3/18       (2006.01)
```

(52) U.S. Cl.
CPC .............. *H02P 29/024* (2013.01); *G05B 9/02* (2013.01); *G05B 19/406* (2013.01); *G05B 19/4062* (2013.01); *G05B 19/4063* (2013.01); *H02P 3/18* (2013.01); *G05B 2219/14116* (2013.01); *G05B 2219/24015* (2013.01); *G05B 2219/34465* (2013.01); *G05B 2219/42318* (2013.01)

(58) Field of Classification Search
CPC ...... G05B 2219/34491; G05B 19/4063; G05B 19/4062; H02H 7/09
See application file for complete search history.

(56) References Cited

U.S. PATENT DOCUMENTS 8,659,254 B2    2/2014  Ueno
2011/0241447 A1 10/2011 Ando et al.
(Continued)

FOREIGN PATENT DOCUMENTS

CN    102208888 A    10/2011
JP    2011-229359 A1 11/2011

OTHER PUBLICATIONS

Extended European Search Report dated Jun. 15, 2018 in Patent Application No. 17197425.6, citing documents AA and AB therein, 10 pages.
(Continued)

*Primary Examiner* — Karen Masih
(74) *Attorney, Agent, or Firm* — Oblon, McClelland, Maier & Neustadt, L.L.P.

(57) ABSTRACT

A motor control system includes a motor, and motor control circuitry that controls driving electric power for the motor based on a driving state quantity of the motor, and upon input of a safety request signal from outside the motor control circuitry, monitors a relationship between a driving state quantity and an operation monitor pattern selected from multiple kinds of operation monitor patterns using multiple simultaneously functioning safety function software modules.

20 Claims, 12 Drawing Sheets

(56) References Cited

U.S. PATENT DOCUMENTS

2013/0038484 A1* 2/2013 Ohkado ............... G01S 13/345
 342/70
2013/0241316 A1 9/2013 Morikawa et al.

OTHER PUBLICATIONS

Office Action issued Mar. 21, 2019, in China Patent Application No. 201710919770.X (w/English-language translation), 13 pgs.

* cited by examiner

MOTOR CONTROL SYSTEM, MOTOR CONTROLLER, AND METHOD FOR SETTING SAFETY FUNCTION

CROSS-REFERENCE TO RELATED APPLICATIONS

The present application claims priority under 35 U.S.C. § 119 to Japanese Patent Application No. 2017-078232, filed Apr. 11, 2017. The contents of this application are incorporated herein by reference in their entirety.

BACKGROUND

Field of the Invention

The present invention relates to a motor control system, a motor controller, and a method for setting a safety function.

Discussion of the Background

JP2011-229359A1 discloses detecting a driving state quantity of a motor, comparing the driving state quantity with various operation monitor patterns specified in safety standards, and stopping feeding of power to the motor when the driving state quantity exceeds the operation monitor patterns.

SUMMARY

According to one aspect of the present invention, a motor control system includes a motor, and motor control circuitry that controls driving electric power for the motor based on a driving state quantity of the motor, and upon input of a safety request signal from outside the motor control circuitry, monitors a relationship between a driving state quantity and an operation monitor pattern selected from multiple kinds of operation monitor patterns using multiple simultaneously functioning safety function software modules.

According to another aspect of the present invention, a motor control apparatus includes control circuitry that controls driving of electric power for a motor and, upon input of a safety request signal indicating whether to decelerate and/or stop the motor, monitors a relationship between a driving state quantity and an operation monitor pattern selected from multiple kinds of operation monitor patterns using multiple simultaneously functioning safety function software modules.

According to yet another aspect of the present invention, a method for controlling a motor includes selecting an operation monitor pattern from multiple kinds of operation monitor patterns, setting the operation monitor pattern selected as a monitor target, and inputting a monitor result obtained by a first safety function software module among multiple simultaneously functioning safety function software modules into a second safety function software module among the safety function software modules as a safety request signal for the second safety function software module. The motor is controlled using a motor control circuitry that controls driving of electric power for the motor and that, upon input of the safety request signal indicating whether to decelerate and/or stop the motor, monitors a relationship between a driving state quantity and the operation monitor pattern using the simultaneously functioning safety function software modules.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
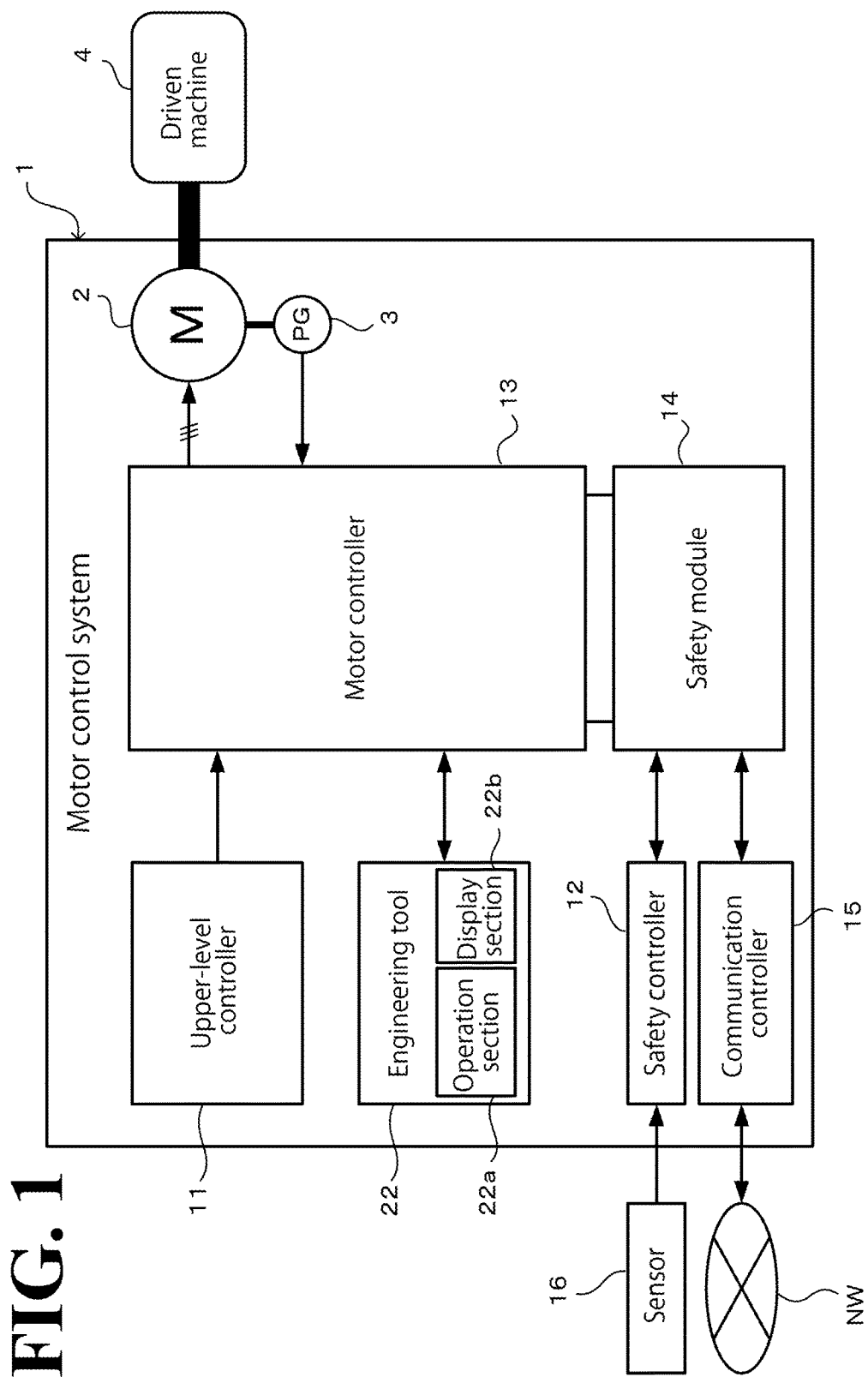
FIG. 1 is a functional block diagram of a schematic configuration of a motor control system according to an embodiment.

The embodiments will now be described with reference to the accompanying drawings, wherein like reference numerals designate corresponding or identical elements throughout the various drawings.

Schematic Configuration of Motor Control System

FIG. 1 is a functional block diagram of a schematic configuration of a motor control system 1 according to this embodiment.

As illustrated in FIG. 1, the motor control system 1 includes a motor 2, an encoder 3, a motor controller 13, a safety module 14, an upper-level controller 11, an engineering tool 22, a safety controller 12, and a communication controller 15.

Figure 2:
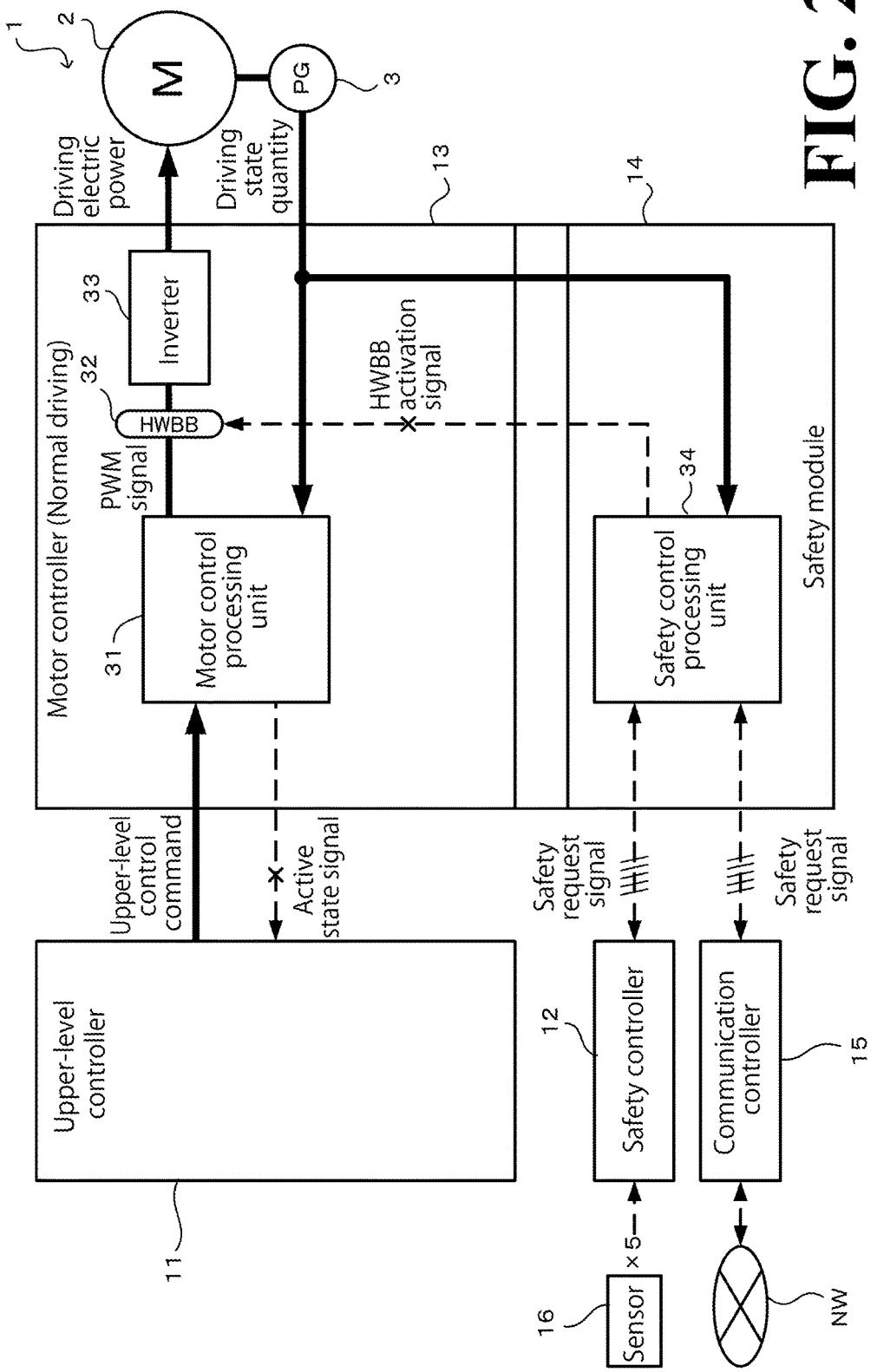
FIG. 2 illustrates signal flows in the motor control system at normal driving time.

The arrows in FIG. 1 indicate connections between these elements and flows of signals exchanged between these elements. An internal configuration of each element will be detailed later. In FIG. 2 and some figures following FIG. 2, broken lines indicate lines for signals that are not being exchanged under the circumstances illustrated but may be exchanged under other circumstances between elements indicated by the broken lines. Each of the elements will be schematically described.

The motor 2 is, for example, a three-phase AC (Alternating Current) motor mechanically connected to a driven machine 4. Examples of the driven machine 4 include, but are not limited to, an industrial machine and a robot.

The encoder 3 is mechanically connected to the motor 2 and detects a driving state quantity of the motor 2. Examples of the driving state quantity include, but are not limited to, the rotational angle of the motor 2.

The motor controller 13 controls driving of the motor 2 based on an upper-level control command and the driving state quantity of the motor 2 detected by the encoder 3. The upper-level control command is basically input from the upper-level controller 11, described later.

The safety module 14 is a function extender additionally connectable to the motor controller 13. When a predetermined condition(s) is met after a safety request signal has been input into the safety module 14 from the safety controller 12 and/or the communication controller 15, described later, the safety module 14 outputs a feeding stopping signal to the motor controller 13 so as to force the motor 2 to decelerate and/or stop.

The upper-level controller 11 outputs to the motor controller 13 an upper-level control command for causing the motor 2 to perform a desired driving operation. Thus, the upper-level controller 11 controls the driving of the motor 2 through feeding control performed by the motor controller 13. The upper-level control command is output in the form of a rotational angle command, a speed command, a torque command, or some other command.

The engineering tool 22 is an interface provided with an operation section 22a and a display section 22b. An operator of the motor control system 1, as necessary, connects the engineering tool 22 to the motor controller 13 so as to make various kinds of setting associated with functions, such as control functions and safety functions, in the motor controller 13 and the safety module 14 and so as to display or update parameters associated with the functions.

Various sensors 16 are disposed in the driven machine 4 or in the surrounding environment of the driven machine 4. When the safety controller 12 has detected from any of the sensors 16 a predetermined state indicating that the motor 2 needs to be decelerated or stopped, the safety controller 12 outputs a safety request signal corresponding to the predetermined state to, in this embodiment, the safety module 14. It is also possible to, depending on what the sensors 16 have detected, output the same safety request signal to the upper-level controller 11 (this flow of the safety request signal is not illustrated).

From outside the motor control system 1, various commands for safety measure purposes are input into the motor control system 1 through a network NW. When such command is input into the motor control system 1, the communication controller 15 outputs a safety request signal corresponding to the command to, in this embodiment, the safety module 14. It is also possible to, depending on details of the safety request signal, output the same safety request signal to the upper-level controller 11 (this flow of the safety request signal is not illustrated).

In this embodiment, the above-described safety request signals are exchanged as binary signals (ON/OFF), and may differ in safety measure significance depending on: the location of the sensor 16, which is a source of the safety request signal; details of the safety request signal; or details of the command input through the network NW. That is, by referring to details (or input source) of the safety request signal, the safety measure significance of the safety request signal can be determined. A non-limiting example of a lower degree of safety measure significance is that the motor 2 only needs to be decelerated to equivalent to or lower than a predetermined speed so that the motor 2 is more easily recovered to normal driving. A non-limiting example of a higher degree of safety measure significance is that the motor 2 needs to be decelerated to a complete stop as quickly as possible, at the expense of recoverability.

In light of this configuration, the safety module 14 and the motor controller 13 according to this embodiment perform different kinds of safety control (that is, control the motor 2 to decelerate and/or stop) depending on the input source of the safety request signal. In this embodiment, the safety control performed upon input of the safety request signal is in "active deceleration mode". In the active deceleration mode, the motor controller 13 performs the control the motor 2 to decelerate and/or stop according to an internal deceleration command generated by the motor controller 13 itself. Another mode is "upper-level controller deceleration mode", which will not be elaborated upon here. In the upper-level controller deceleration mode, the motor controller 13 performs the control the motor 2 to decelerate and/or stop according to an upper-level control command from the upper-level controller 11. Which mode to select can be set in advance by the user using the engineering tool 22, which is illustrated in FIG. 1.

Configuration Details of Motor Control System and Safety Control

Figure 3:
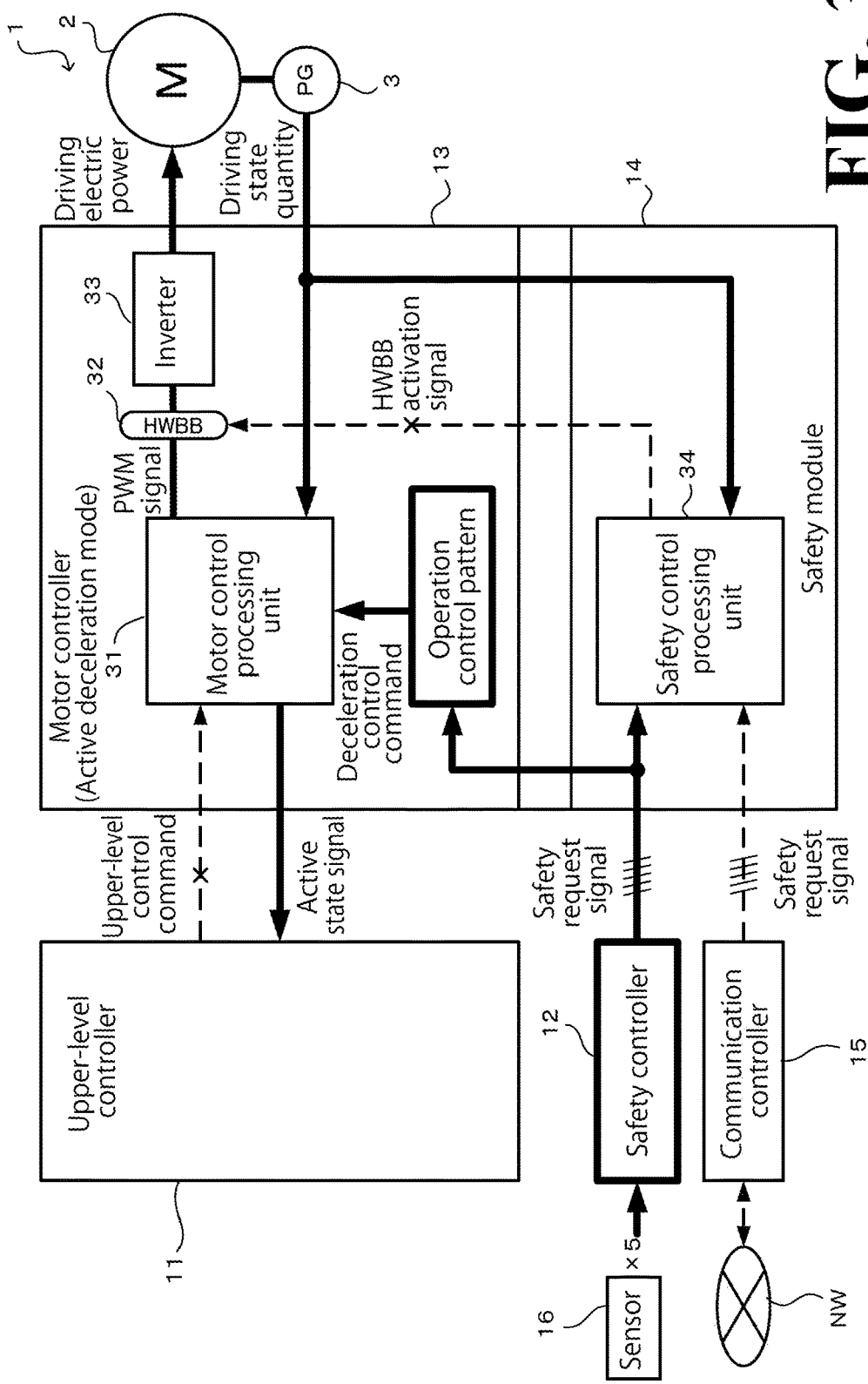
FIG. 3 illustrates signal flows in the motor control system in active deceleration mode.
Figure 4:
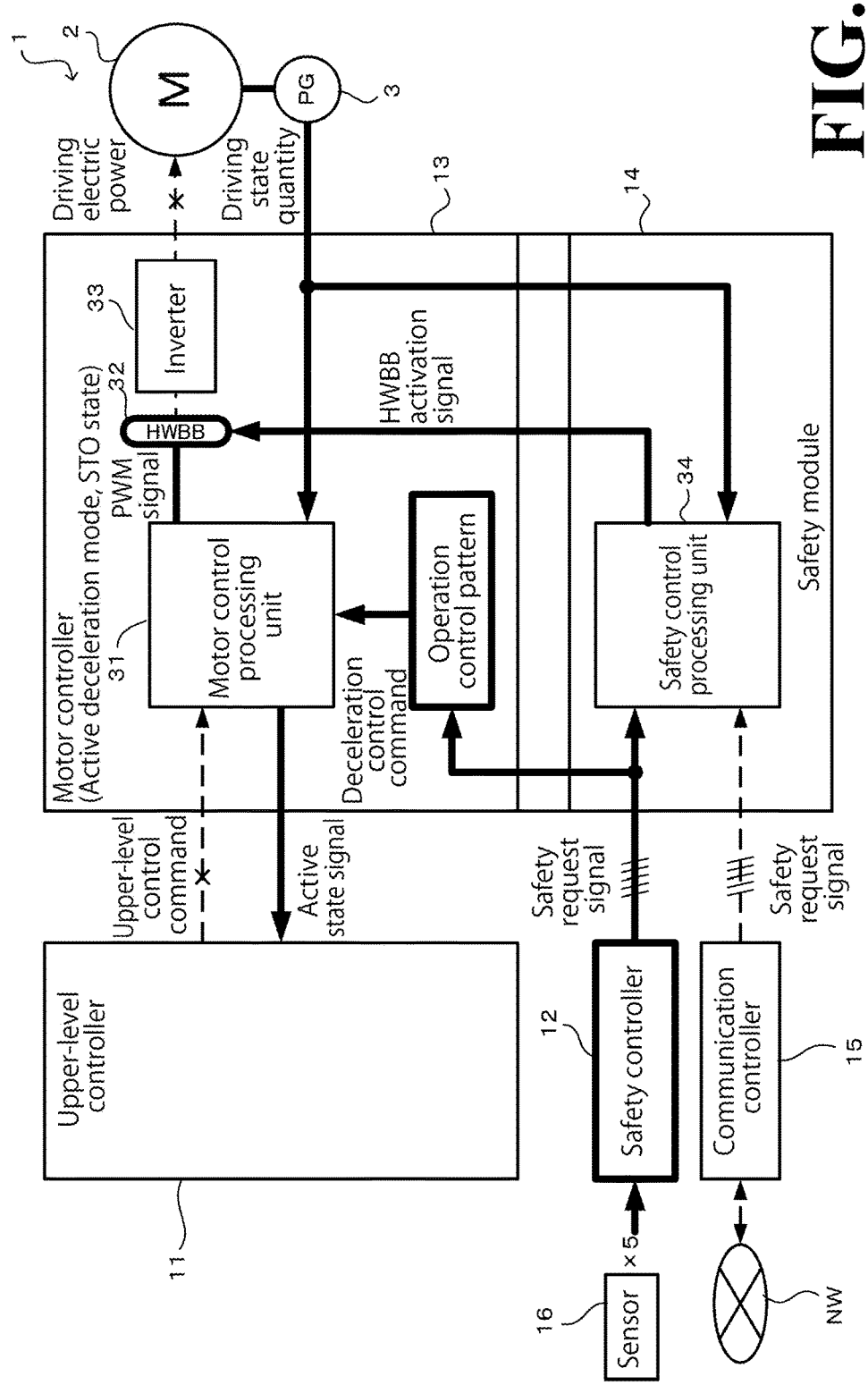
FIG. 4 illustrates signal flows in the motor control system at STO state time.

FIGS. 2 to 4 illustrate signal flows in the motor control system 1. FIG. 2 corresponds to normal driving time, FIG. 3 corresponds to active deceleration mode (described later), and FIG. 4 corresponds to STO state (described later) time. In the embodiment illustrated in FIGS. 2 to 4, a hard wire base block (HWBB) 32 and an inverter 33 of the motor controller 13 have hardware circuit configurations, and function units disposed in the motor controller 13 and function units disposed in the safety module 14 have software configurations. Each software configuration is executed by each unit's CPU. Also in the embodiment illustrated in FIGS. 2 to 4, five sensors 16 are provided, and the safety controller 12 is capable of outputting five kinds of safety request signals respectively corresponding to detection results obtained by the five sensors 16. The communication controller 15 is capable of inputting and outputting five kinds of safety request signals through the network NW.

As illustrated in FIGS. 2 to 4, the motor controller 13 includes a motor control processing unit 31, the HWBB 32, and the inverter 33. The motor control processing unit 31 is a software block, and the HWBB 32 and the inverter 33 have hardware circuits, as described above. The safety module 14 includes a safety control processing unit 34, which is a software block.

The motor control processing unit 31 refers to, as a feedback signal, the driving state quantity of the motor 2 detected by the encoder 3, and, at the same time, performs feeding control (switching control performed by the inverter 33 using a PWM signal, as described later) with respect to the motor 2 according to a predetermined drive control command (for example, the upper-level control command from the upper-level controller 11).

The HWBB 32 (feeding stopper) includes a semiconductor switching element that switches between making and breaking a conduction of a PWM signal output from the motor control processing unit 31 to the inverter 33. Specifically, when an HWBB activation signal (feeding stopping signal) is input into the HWBB 32, the HWBB 32 blocks the PWM signal so as to stop feeding of electric power to the motor 2 through the inverter 33. The HWBB 32 is a non-limiting example of the feeding stopper recited in the appended claims, and the HWBB activation signal is a non-limiting example of the feeding stopping signal recited in the appended claims.

The inverter 33 converts electric power supplied from a commercial power source, not illustrated, into driving electric power for the motor 2 based on the PWM signal input from the motor control processing unit 31.

When the driving state quantity of the motor 2 detected by the encoder 3 exceeds an operation monitor pattern, described later, the safety control processing unit 34 outputs an HWBB activation signal to activate the HWBB 32 (block the PWM signal). The operation monitor pattern is selected as desired in a setting operation, described later, from a plurality of kinds of time-series change patterns (described later by referring to FIGS. 9 to 11) specified in certain safety standards (as detailed later).

As illustrated in FIG. 2, at normal driving time of the driven machine 4, the upper-level controller 11 outputs to the motor controller 13 an upper-level control command, which is generated to cause predetermined driving of the motor 2. Then, the motor controller 13 inputs the input upper-level control command into the motor control processing unit 31 without making any changes to the input upper-level control command. Then, the motor control processing unit 31 outputs a PWM signal based on the upper-level control command while referring to, as a feedback signal, the driving state quantity detected by the encoder 3. At the normal driving time, no HWBB activation signal is output from the safety control processing unit 34, and this allows the PWM signal to be input into the inverter 33 through the HWBB 32. Then, the inverter 33 allows driving electric power corresponding to the PWM signal to be fed to the motor 2. This configuration enables the motor control system 1 as a whole to implement stable driving of the motor 2 based on the upper-level control command from the upper-level controller 11. At the normal driving time, no detection signals are output from the five sensors 16 and, accordingly, none of five safety request signals respectively corresponding to the detection signals is output from the safety controller 12. Similarly, no commands for safety measure purposes are input into the communication controller 15 from the network NW and, accordingly, no safety request signals respectively corresponding to the commands are output from the communication controller 15.

Assume that during the normal driving of the driven machine 4, any one of the sensors 16 has output a detection signal indicating an abnormality. In this case, as illustrated in FIG. 3, the safety controller 12 outputs to the safety module 14 a safety request signal corresponding to the sensor 16. Then, through the safety module 14 in which the safety request signal has been input, the motor controller 13 controls the motor 2 to decelerate and/or stop in the active deceleration mode.

In the active deceleration mode illustrated in FIG. 3, an internal deceleration command that is based on an operation control pattern compliant with certain safety standards is generated in the motor controller 13 and input into the motor control processing unit 31 as a deceleration control command. That is, instead of the upper-level controller 11, the motor controller 13 autonomously controls the motor 2 to decelerate and/or stop. In the active deceleration mode, no system configuration is necessary to input the safety request signal into the upper-level controller 11, and the motor control processing unit 31 outputs an active state signal to the upper-level controller 11 so that the upper-level controller 11 receiving the active state signal stops outputting the upper-level control command.

As described above, assume that after the safety request signal has been input into the safety control processing unit 34 of the safety module 14 from the safety controller 12, the driving state quantity of the motor 2 exceeds the operation monitor pattern, described later. In this case, the safety control processing unit 34 outputs an HWBB activation signal to activate the HWBB 32 (block the PWM signal). As described in detail later, such a case is possible, depending on the kind of the operation monitor pattern applied, that the operation monitor pattern itself outputs an HWBB activation signal to activate the HWBB 32 at a predetermined timing after input of the safety request signal from the safety controller 12.

When the HWBB 32 has been activated in any manner described above, the PWM signal from the motor control processing unit 31 is blocked by the HWBB 32 in the motor controller 13, as illustrated in FIG. 4, resulting in a safety torque off (STO) state, in which the inverter 33 stops feeding of driving electric power to the motor 2. While the STO state involves lower recoverability, which means how easy it is to resume driving of the driven machine 4, the motor 2 can be decelerated to a complete stop as quickly as possible. Therefore, the STO state is the safest and most reliable state of safety control.

Features of this Embodiment

In the motor control system 1, which drives the driven machine 4, it is necessary to control the motor 2 to perform a deceleration operation and/or a stopping operation that are compliant with various operation patterns specified in certain safety standards (an operation pattern is a general term of a combination of an operation control pattern and an operation monitor pattern corresponding to each other, which also applies in the following description). Conventional practice to afford this necessity has been to employ a safety control processing unit. The safety control processing unit compares a detected driving state quantity of the motor with an operation monitor pattern corresponding to an operation pattern selected from the above-described various operation patterns, and stops feeding of electric power to the motor when the driving state quantity exceeds the operation monitor pattern.

In the conventional safety control processing unit, the operation patterns are fixed, and there has been a need for a higher degree of variability of the operation monitor patterns in light of the configuration and/or operation environment of the driven machine 4, a driving target.

In light of the circumstances, the safety control processing unit 34 according to this embodiment is disposed in the safety module 14 (which is a part of the motor controller 13) and includes a plurality of safety function units configured to function simultaneously with each other. Each of the plurality of safety function units, upon input of an external safety request signal, monitors a relationship between a driving state quantity of the motor 2 and an operation monitor pattern selected from a plurality of kinds of operation monitor patterns. This configuration provides each safety function unit with a higher degree of freedom to determine which operation monitor pattern to apply, and, as a result, makes the safety functions of the motor control system 1 more versatile. Additionally, making the plurality of safety function units capable of functioning simultaneously with each other enables the operation control of the motor 2 and the driven machine 4 to be monitored using various operation patterns combined with a plurality of operation monitor patterns selected as desired. This configuration further improves the versatility of the safety functions of the motor control system 1. This configuration will be described in more detail below.

Operation Patterns

Some operation patterns applicable to the elements of this embodiment will be described. Among a large number of operation patterns specified in the International Standard IEC 61800-5-2, the following description deals with three kinds of operation patterns, namely, safe base block function (hereinafter referred to as SBB (STO)), safety limited speed monitor function (hereinafter referred to as SLS), and safe position monitor with-delay function (hereinafter referred to as SPM-D (SS2)). It is noted that these function names are informal names that may be inapplicable other than in this embodiment. The following description is under the assumption that an HWBB activation signal is output unconditionally when the driving state quantity of the motor 2 exceeds the operation monitor pattern.

Figure 5:
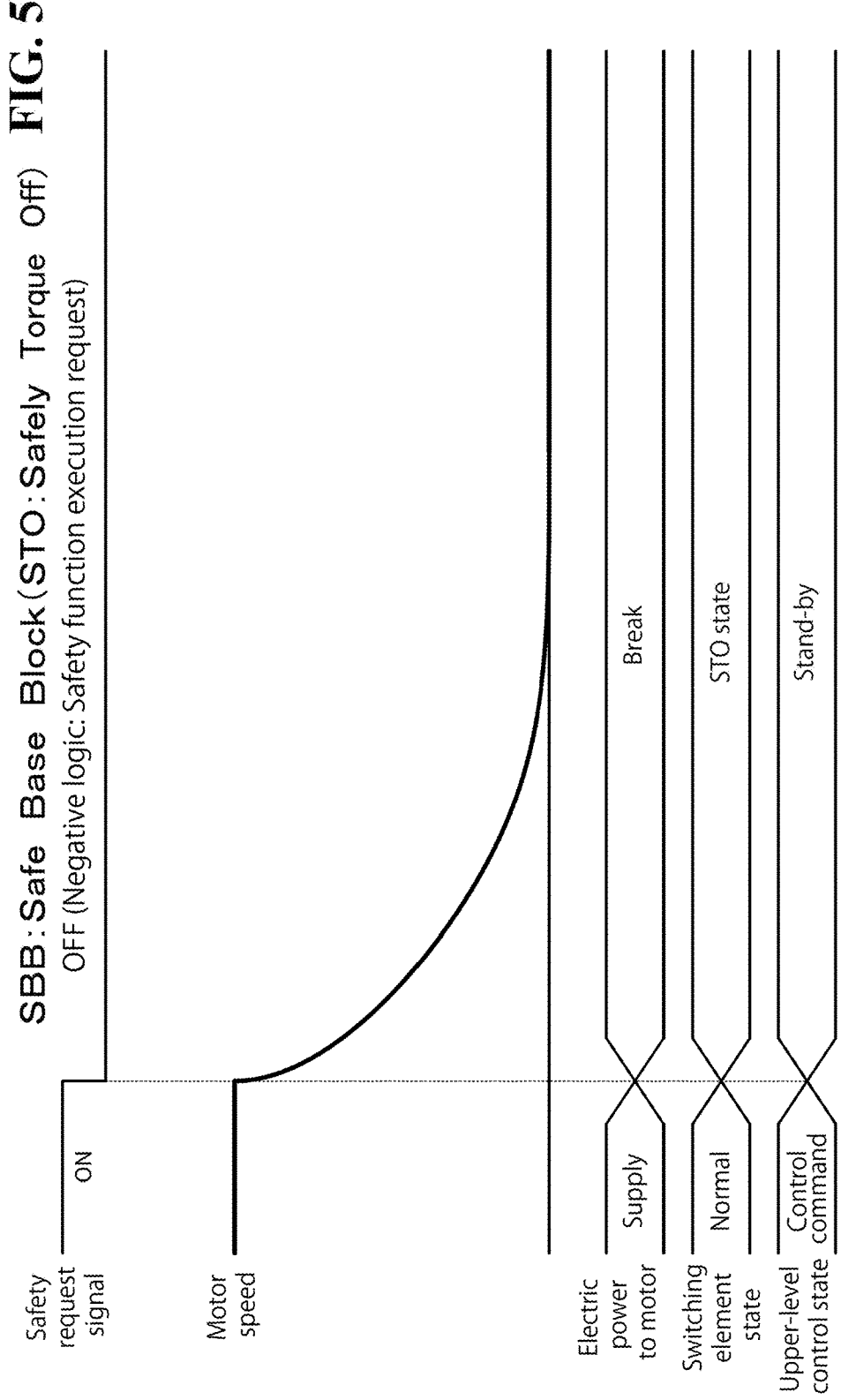
FIG. 5 is a time chart of an SBB operation pattern.

FIG. 5 is a time chart of an SBB operation pattern used in the control operation performed by the upper-level controller 11. Referring to FIG. 5, immediately after the safety request signal, which is negative logic, has been switched to low-level "OFF", the safety control processing unit 34 outputs an HWBB activation signal to cause the HWBB 32 to block the PWM signal, causing the inverter 33 to stop feeding of driving electric power to the motor 2. This causes the speed of the motor 2 to quickly decrease to a complete stop.

Figure 6:
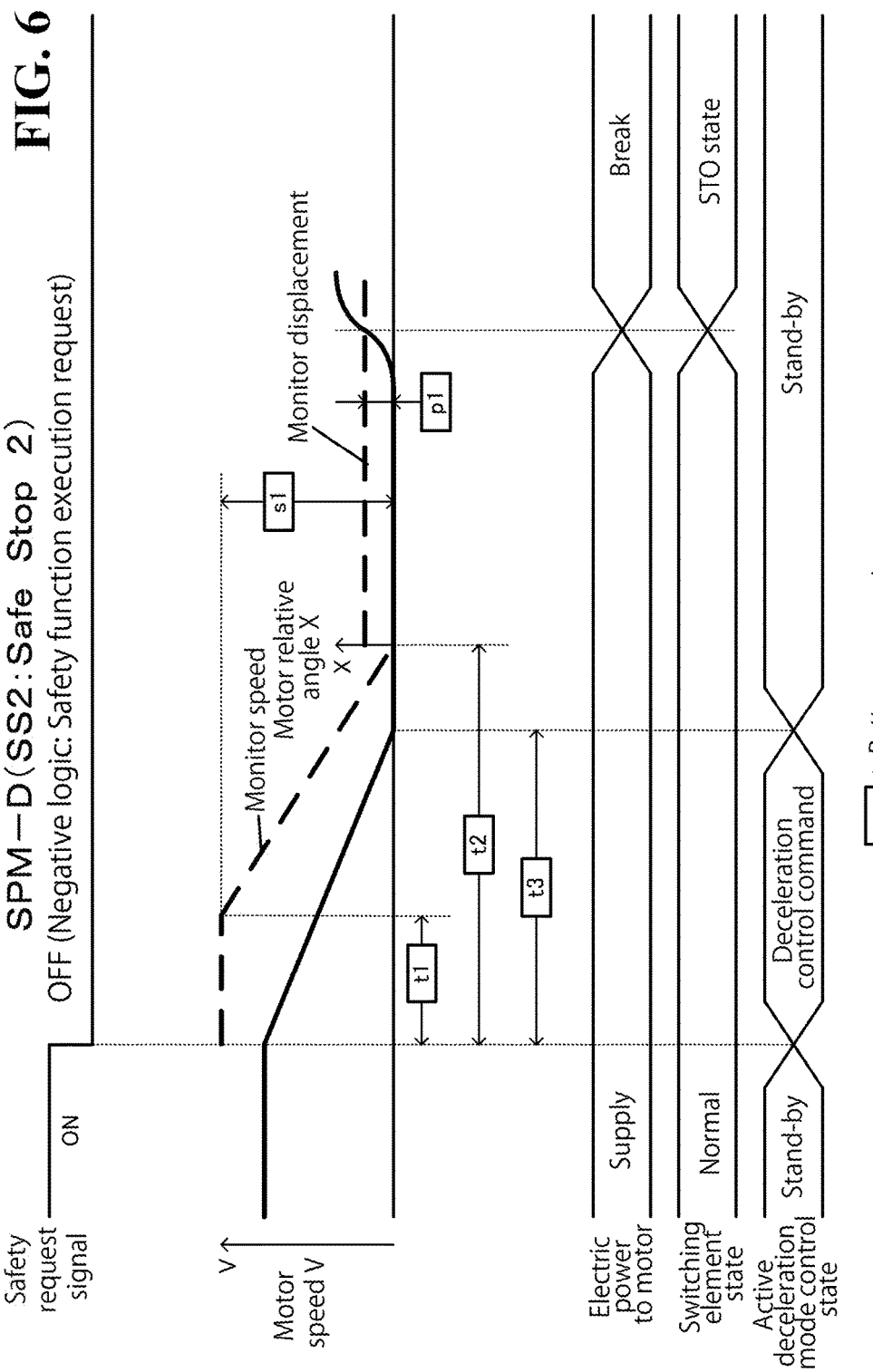
FIG. 6 is a time chart of an SPM-D operation pattern.

FIG. 6 is a time chart of an SPM-D operation pattern used in active deceleration mode. Referring to FIG. 6, immediately after the safety request signal, which is negative logic, has been switched to low-level "OFF", the motor controller 13 switches to active deceleration mode and, according to an operation control pattern corresponding to the active deceleration mode, causes the motor control processing unit 31 to decelerate and/or stop the motor 2 at a predetermined deceleration ratio.

In the active deceleration mode, it is sometimes or often the case that even though the motor controller outputs the deceleration control command according to the operation control pattern, as described above, the speed of the motor may not necessarily decrease, as opposed to the deceleration control command. A possible cause of this occurrence is an abnormality and/or a failure in the motor and/or the encoder. Another possible cause of the above occurrence is a reaction force, a disturbance, or other force or action that the motor receives from the driven machine and that is irrelevant to the deceleration control command. In light of the circumstances, the safety control processing unit 34 according to this embodiment performs monitoring, upon input of a safety request signal into the safety module 14, by comparing an operation monitor pattern set in advance by the user as a parameter with the actual speed of the motor 2 that is based on the driving state quantity detected by the encoder 3. When, as a result of the comparison, such a non-illustrated relationship is found that the speed of the motor 2 is in excess of the monitor speed of the operation monitor pattern, the safety control processing unit 34 immediately outputs an HWBB activation signal even during the deceleration control performed by the motor control processing unit 31, prioritizing safety and forcing the feeding of electric power to the motor 2 to stop (which results in STO state).

Then, after the safety request signal has been switched to "OFF" state and the monitor speed has reached zero at deceleration end timing t2, the safety control processing unit 34 performs monitoring, according to the operation monitor pattern, by checking whether the actual stopping angle of the motor 2 (driving state quantity detected by the encoder 3) is relatively in excess of predetermined monitor displacement p1 of the operation monitor pattern. Then, when such a relationship is found that as illustrated in FIG. 6, the actual rotational angle of the motor 2 is in excess of the predetermined monitor displacement p1 of the operation monitor pattern, the safety control processing unit 34 immediately outputs an HWBB activation signal to force the feeding of electric power to the motor 2 to stop (which results in STO state).

Figure 7:
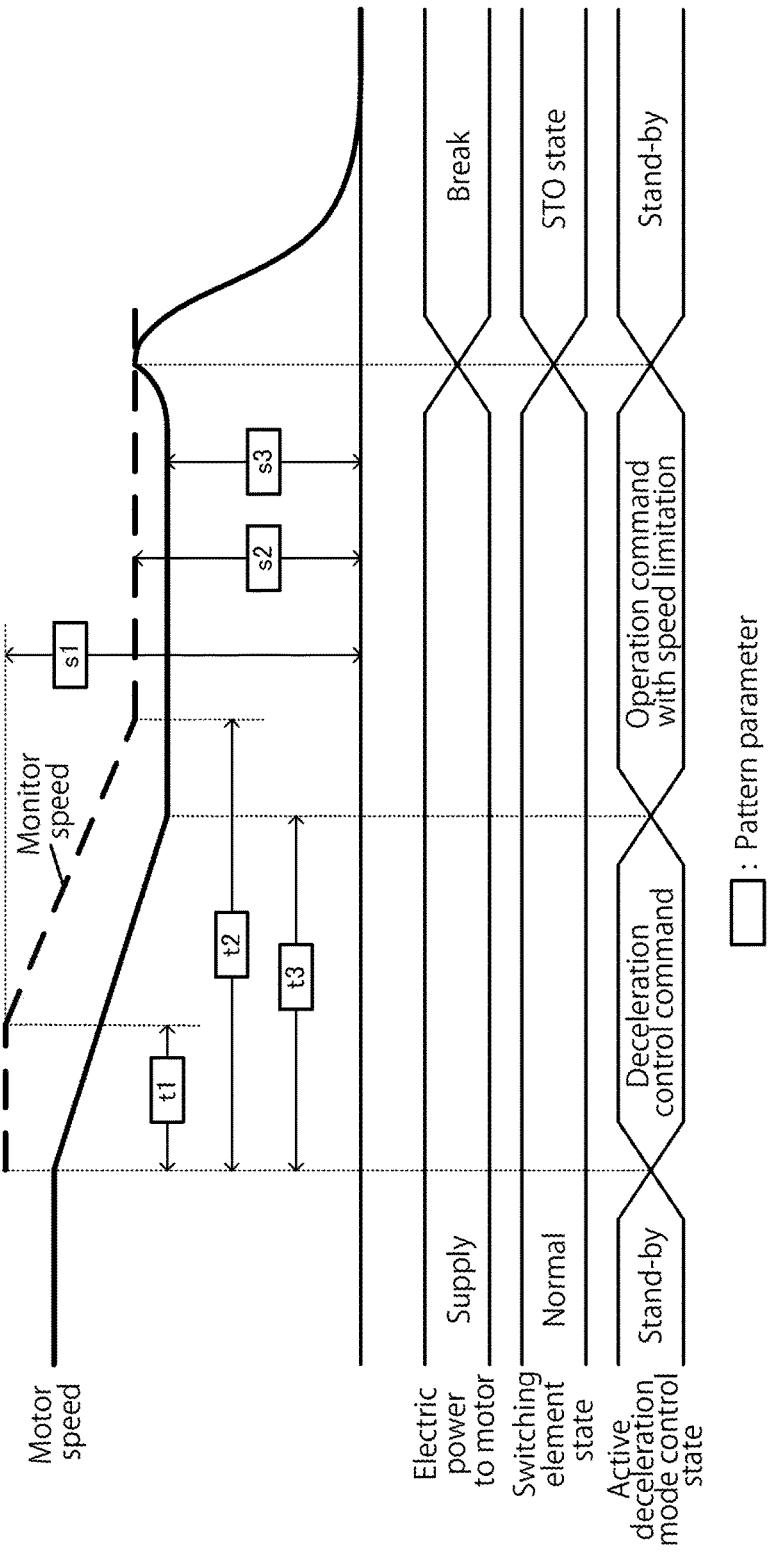
FIG. 7 is a time chart of an SLS operation pattern.

FIG. 7 is a time chart of an SLS operation pattern used in active deceleration mode. Referring to FIG. 7, when the safety request signal, which is negative logic, has been switched to low-level "OFF", the operation control pattern outputs a deceleration control command causing the motor 2 to decelerate to a limited speed of s3 until predetermined time t3.

The safety control processing unit 34 of the safety module 14 monitors, according to the operation monitor pattern, the actual speed of the motor 2 using a monitor speed initially set at a maximum speed of s1. Then, the safety control processing unit 34 monitors the actual speed of the motor 2 using a monitor speed that is decreasing past deceleration start timing t1. Then, the monitor speed stops decreasing at deceleration end timing t2. Then, the safety control processing unit 34 performs monitoring by checking whether the actual speed of the motor 2 is in excess of monitor speed s2, which is comparatively low.

Safety Function Units

As has been described hereinbefore, an operation pattern is a combination of an operation control pattern and an operation monitor pattern, and a large number of such operation patterns are specified in the above-described safety standards. For the operation monitor pattern of the operation pattern, the safety control processing unit 34 of the safety module 14 according to this embodiment performs monitoring by checking whether the driving state quantity is in excess of the operation monitor pattern. Also in this embodiment, the safety control processing unit 34 includes a plurality of safety function units in the safety control processing unit 34, as described above. The safety control processing unit 34 selects an operation monitor pattern as a comparative monitoring target for each of the plurality of safety function units, and performs monitoring by comparing the selected operation monitor pattern with a driving state quantity.

Figure 8:
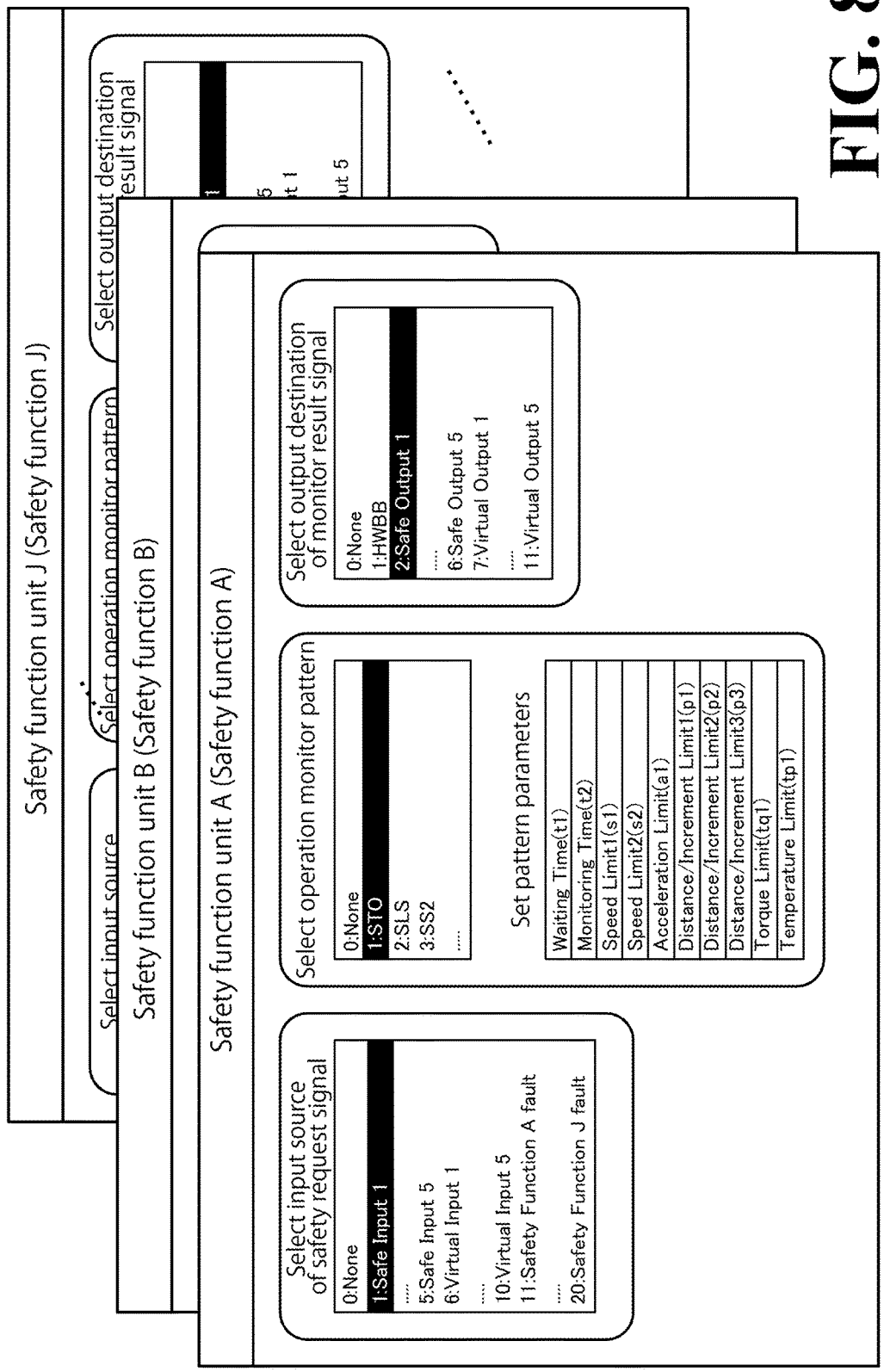
FIG. 8 illustrates exemplary setting screens each for an individual safety function unit.

FIG. 8 illustrates exemplary setting screens each for an individual safety function unit. Specifically, FIG. 8 illustrates an exemplary setting screen of the display section 22*b* of the engineering tool 22. Specifically, the display section 22*b* displays setting windows of 10 safety function units, namely, safety function units A to J (note that the safety function units C to I are omitted for simplicity reasons), and each of the safety function units can be individually selected and subjected to settings by an input operation on the operation section 22*a*.

The safety function units A to J have the same three setting items, namely, "Select input source of safety request signal", "Select operation monitor pattern", and "Select output destination of monitor result signal". The setting item "Select input source of safety request signal" is for selecting the input source of the safety request signal, which serves as a basis for start of operation of the safety function unit. Specifically, options are "0 (: None)", "1 to 5 (: Safe Inputs 1 to 5)", "6 to 10 (: Virtual Inputs 1 to 5)", and "11 to 20 (: Safety Functions A to J fault)". "0 (: None)" indicates that no safety request signal is input. "1 to 5 (: Safe Inputs 1 to 5)" indicates that any one of five safety request signals from the safety controller 12 is selected. "6 to 10 (: Virtual Inputs 1 to 5)" indicates that any one of five safety request signals from the communication controller 15 is selected. "11 to 20 (: Safety Functions A to J fault)" indicates that excessive state occurrence time trigger (referred to as "Fault" or "Fault Out" in the following description and the drawings) is selected as a safety request signal. The excessive state occurrence time trigger is a trigger for the driving state quantity exceeding the monitor operation pattern in any of the safety function units A to J.

The setting item "Select operation monitor pattern" is for selecting the kind of the operation monitor pattern to which the safety function unit refers. Specifically, options include "0 (: None)", "1 (: STO)", "2 (: SLS)", and "3 (: SS2)". "0 (: None)" indicates that no operation monitor pattern is referred to. "1 (: STO)" indicates that the operation monitor pattern (a pattern that turns into STO state immediately at the input time of the safety request signal) of the safe base block function SBB is selected. "2 (: SLS)" indicates that the operation monitor pattern of the safety limited speed monitor function SLS is selected. "3 (: SS2)" indicates that the operation monitor pattern of the safe position monitor with-delay function SPM-D is selected. Other options are not illustrated. The setting item "Select operation monitor pattern" is also for setting pattern parameters (indicated "t1" and "t2" in the drawings) defining the shape of the selected operation monitor pattern changing with time. In the motor controller 13, the operation control pattern corresponding to the operation monitor pattern selected on this setting item is employed and caused to function in a synchronous manner with the time at which the safety function unit functions. This configuration ensures that the operation control pattern and the operation monitor pattern that are same in kind are executed simultaneously with each other.

The setting item "Select output destination of monitor result signal" is for selecting the output destination of a monitor result signal. The monitor result signal is a comparison monitor result, which indicates whether a Fault has occurred at the present point of time in the safety function unit. Specifically, options are "0 (: None)", "1 (: HWBB)", "2 to 6 (: Safe Output 1 to 5)", and "7 to 11 (: Virtual Output 1 to 5)". "0 (: None)" indicates that no monitor result signal is output. "1 (: HWBB)" indicates that the monitor result signal is output as it is as an HWBB activation signal. "2 to 6 (: Safe Output 1 to 5)" indicates that any one of five output destinations for the safety controller 12 is selected. "7 to 11 (: Virtual Output 1 to 5)" indicates that any one of five output destinations for the communication controller 15 is selected. When the monitor result signal indicates an excessive state, that is, excessive state occurrence time trigger "Fault Out", a predetermined, standard output is made, irrespective of the setting of the output destination (described later by referring to FIG. 9).

Figure 9:
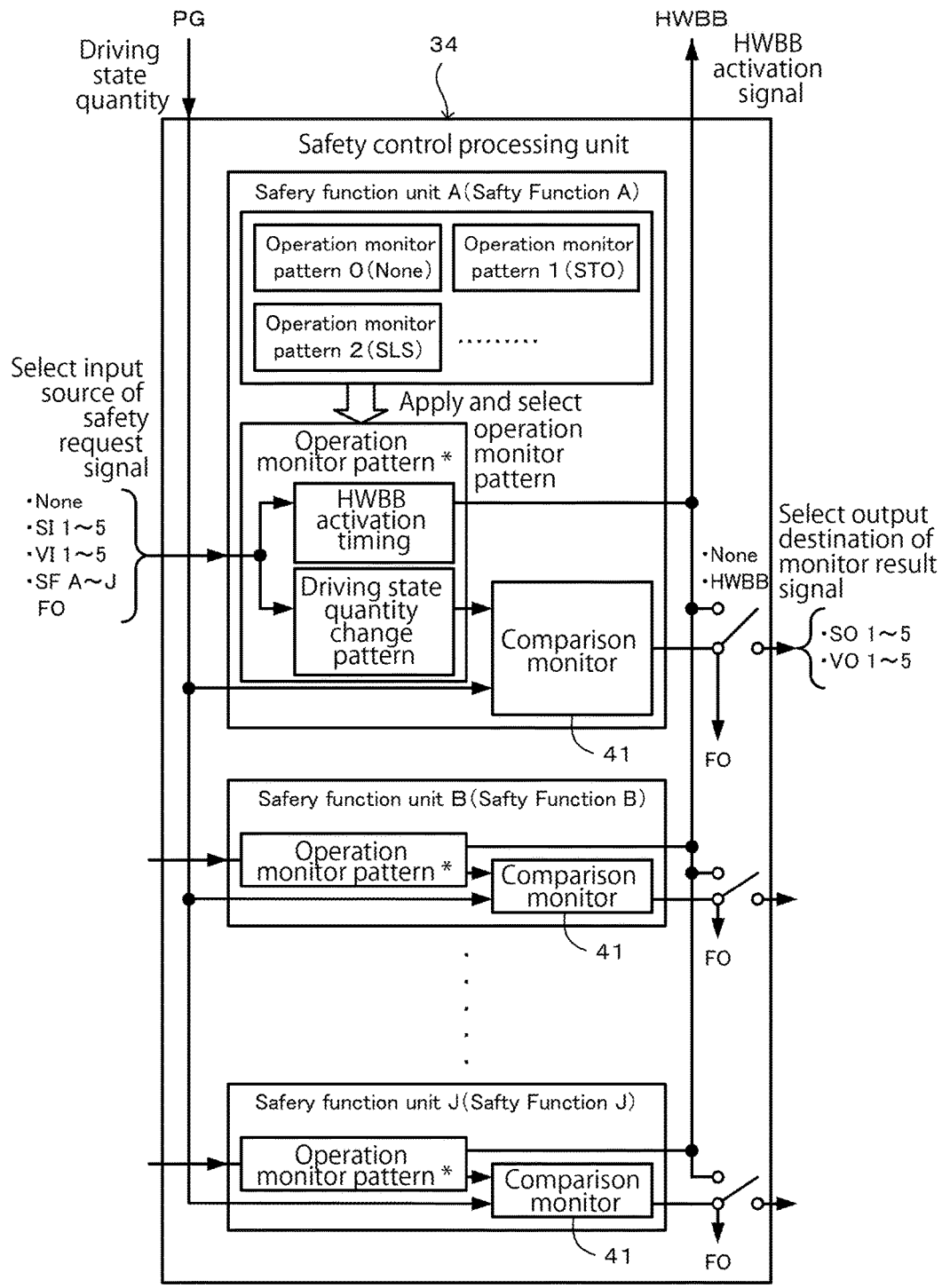
FIG. 9 illustrates a software block configuration of a safety control processing unit provided with a plurality of safety function units.

FIG. 9 illustrates a software block configuration of the safety control processing unit 34. The safety control processing unit 34 includes a plurality of safety function units that can be set in the above-described manner. Referring to FIG. 9, the safety control processing unit 34 includes the 10 safety function units A to J in parallel to each other. Each of the 10 safety function units A to J is capable of referring to the driving state quantity. Also, each of the 10 safety function units A to J is connected to any one input source selected on the setting item "Select input source of safety request signal" (the input sources are simply indicated "None", "SI", "VI", and "SFA to JFO" in FIG. 9) so that a safety request signal can be input into the safety function unit from the one input source (the safety function unit is not connected anywhere when "0: None" is selected). Also, each of the 10 safety function units A to J is connected to any one output destination selected on the setting item "Select output destination of monitor result signal" (the output destinations are simply indicated "None", "HWBB", "SO", and "VO" in FIG. 9) so that a monitor result signal can be output to the one output destination from the safety function unit (the safety function unit is not connected anywhere when "0: None" is selected, and the safety function unit is connected to HWBB when "1: HWBB" is selected). As described above, when the monitor result signal indicates an excessive state, that is, excessive state occurrence time trigger "Fault Out", a predetermined, standard output (see "FO" in FIG. 9) is made, irrespective of the setting of the output destination.

Each of the 10 safety function units A to J includes, in each safety function unit, a selected operation monitor pattern and a comparison monitor 41. The operation monitor pattern processed in each safety function unit includes at least one of two step elements, namely, HWBB activation timing and motor speed/angle change chart. The step element "HWBB activation timing" functions to output an HWBB activation signal directly to the HWBB 32 at a predetermined timing after input of the safety request signal from outside the safety control processing unit 34. The step element "motor speed/angle change chart" functions to, upon input of the safety request signal from outside the safety control processing unit 34, output a change value associated with the motor 2 to the comparison monitor 41. Examples of the change value include, but are not limited to: a change value of the speed of the motor 2 that changes or becomes constant at a predetermined step; and a change value of a relative angle of the motor 2 that becomes constant at and later than a predetermined timing. The comparison monitor 41 compares the driving state quantity of the motor 2 with the change value output from the motor speed/angle change chart.

Whether one or both of the two step elements is(are) included in the operation monitor pattern depends on the kind of the operation monitor pattern. In the embodiment of FIG. 9, both of the two step elements are included in the operation monitor pattern. In this case, the safety request signal from outside the safety control processing unit 34 is input into the two step elements simultaneously so that the two steps are performed simultaneously and independently. It is noted that the operation control pattern processed in the motor controller 13 includes the step element "motor speed/angle change chart" alone, without the step element "HWBB activation timing". That is, in the active deceleration mode, the change value output from the motor speed/angle change chart in the operation control pattern is used as a deceleration control command.

With this configuration, the comparison monitor 41 outputs, as a monitor result signal, an excessive state occurrence time trigger "Fault Out" when such an operation state occurs that the actual driving state quantity of the motor 2 exceeds the operation monitor pattern (specifically, the change value output from the motor speed/angle change chart), deviating from the above-described safety standards. When the HWBB 32 is selected as the output destination of the excessive state occurrence time trigger "Fault Out", an HWBB activation signal is output from the HWBB 32 to stop feeding of electric power to the motor 2. Thus, the motor 2 is controlled to decelerate and/or stop more reliably and more quickly. In this embodiment, the plurality of safety function units A to J are software processing units processed by one CPU provided in the safety module 14. When the plurality of safety function units are to function simultaneously with each other, the CPU enables the plurality of safety function units to function simultaneously with each other by, for example, time division processing (for example, all active safety function units are processed in a predetermined order within one scanning time).

Exemplary Setting of Safety Function Units

Figure 10:
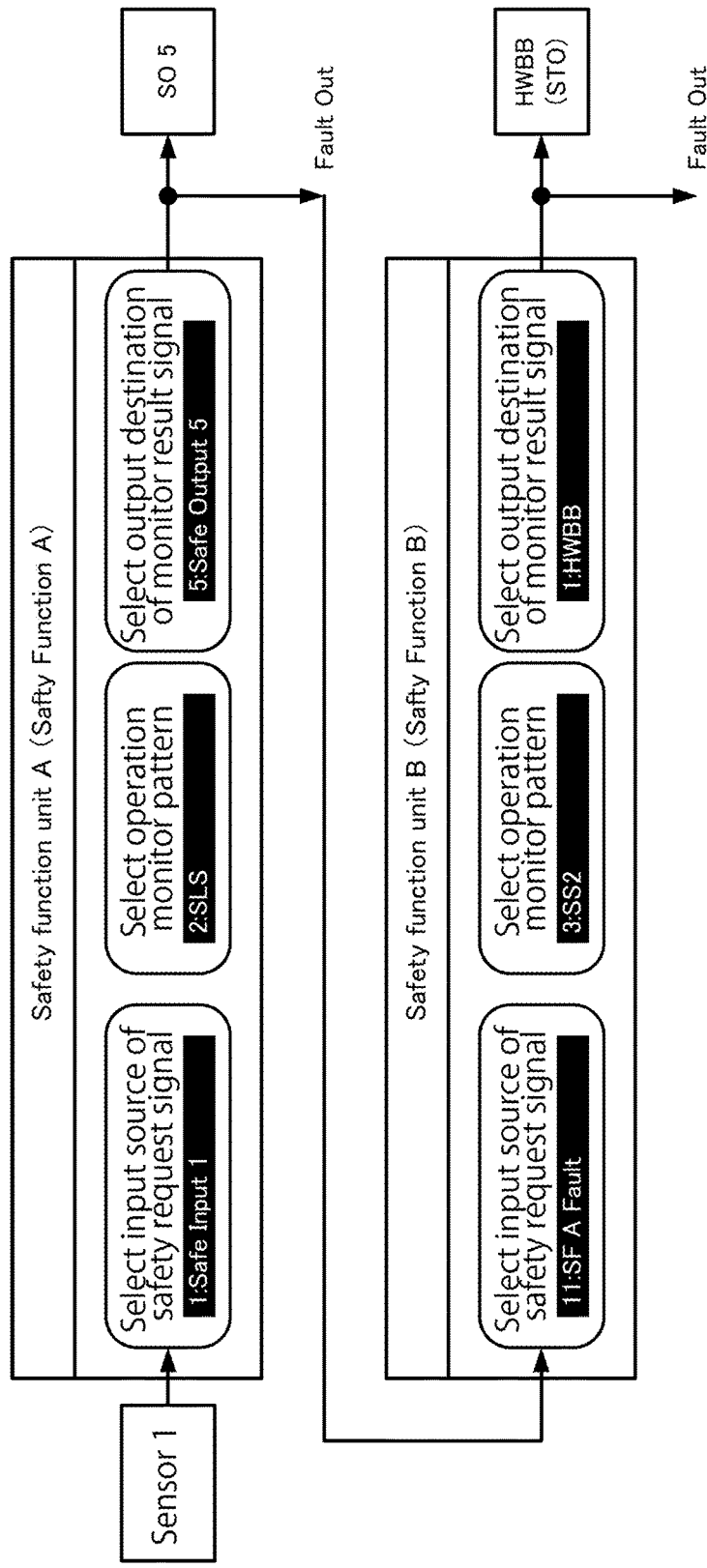
FIG. 10 illustrates an exemplary setting screen for two safety function units set to function in series with each other.

Description will be made below with regard to setting of the safety function units of the safety control processing unit 34 having the above-described configuration. FIG. 10 illustrates, in relation to FIG. 8, an exemplary setting screen for the safety function unit A and the safety function unit B set to function in series with each other. To avoid complicated illustration, only relevant parts are illustrated in FIG. 10.

Figure 11:
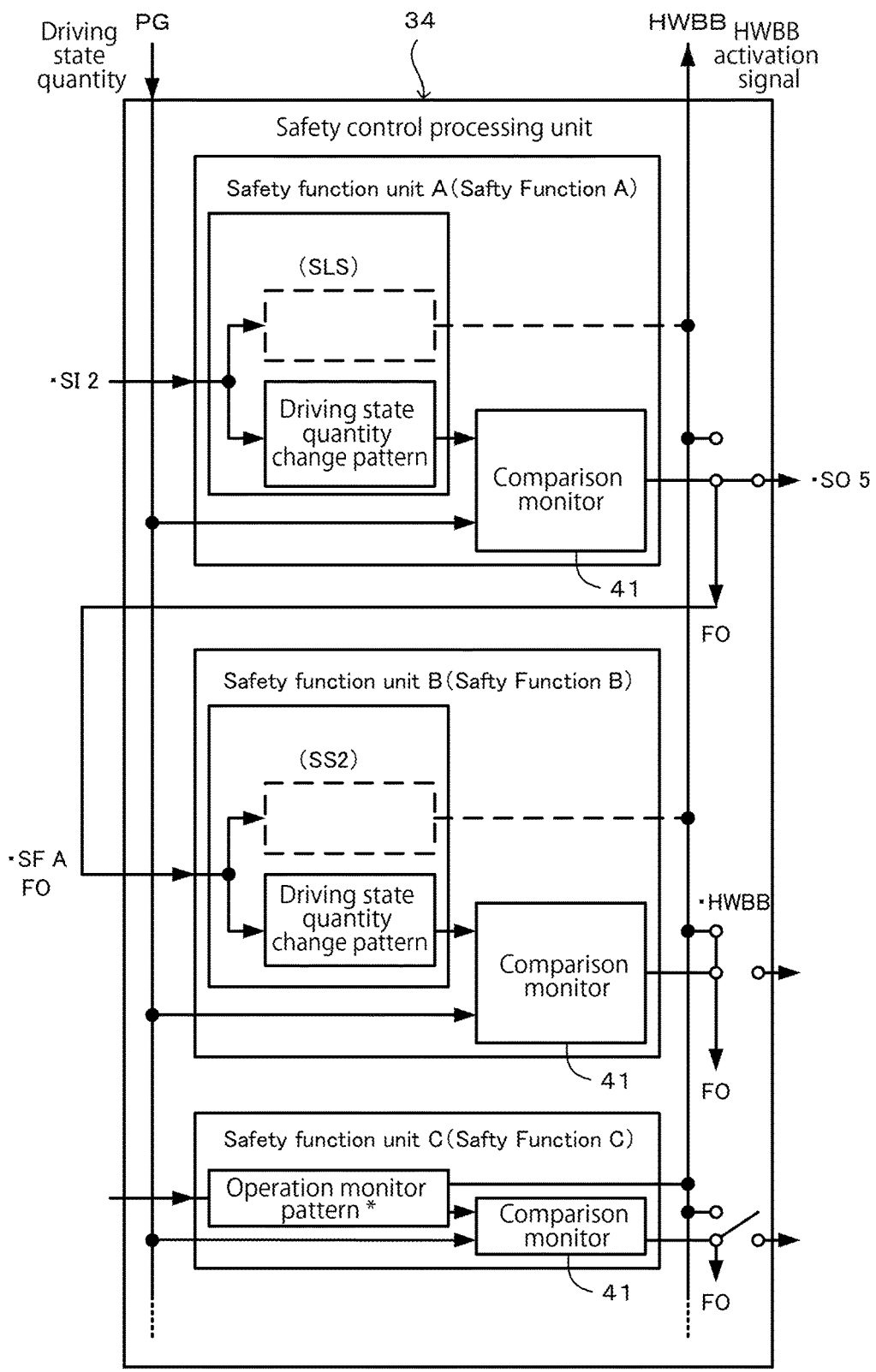
FIG. 11 illustrates a software block configuration of the safety control processing unit with two safety function units set to function in series with each other.

Referring to FIG. 10, in the safety function unit A, the first sensor 16 for the safety controller 12 is selected as an input source on the "Select input source of safety request signal", the operation monitor pattern "safety limited speed monitor function SLS" is selected on the "Select operation monitor pattern", and the fifth output destination of the monitor result signal from the safety controller 12 is selected on the "Select output destination of monitor result signal". In the safety function unit B, the "Fault" (the excessive state occurrence time trigger "Fault Out") of the safety function unit A is selected as an input source on the "Select input source of safety request signal", the operation monitor pattern "safe position monitor with-delay function SS2" is selected on the "Select operation monitor pattern", and the HWBB 32 is selected as an output destination on the "Select output destination of monitor result signal". In this example of setting, the software blocks of the safety function units are connected to each other as illustrated in FIG. 11, which corresponds to FIG. 9. Also in this example of setting, the operation monitor patterns selected in the safety function units A and B are SLS and SS2, respectively. In this configuration, the step element "HWBB activation timing" does not function in either pattern (see broken lines in FIG. 10). The other safety function units do not function, being not connected to any input source of a safety request signal or any output destination of a monitor result signal.

Figure 12:
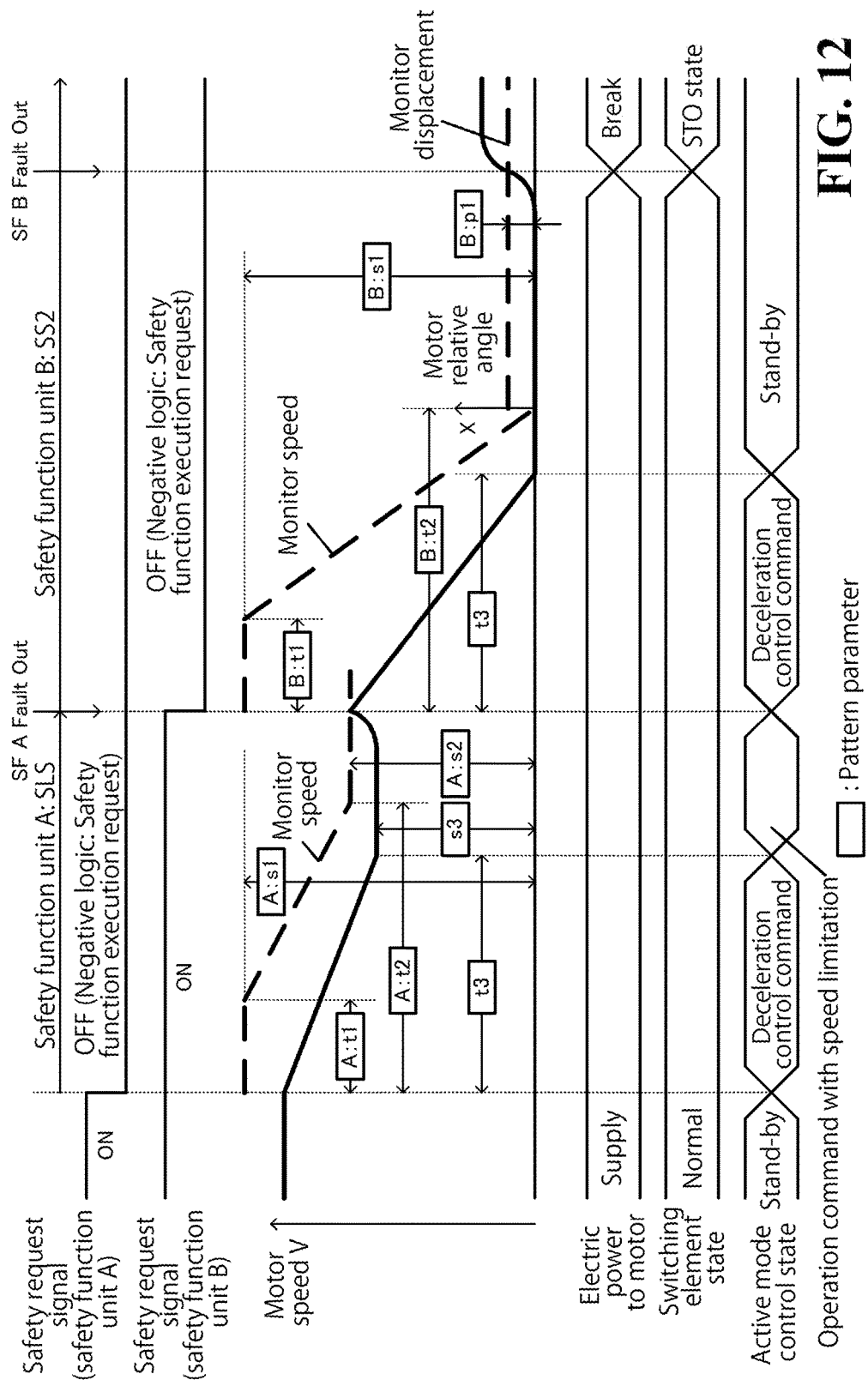
FIG. 12 is a time chart of an operation pattern with two safety function units set to function in series with each other.

FIG. 12 is a time chart of an operation pattern in this example of setting. Referring to FIG. 12, upon input of a safety request signal at the time of normal driving, the safety function unit A functions first to control and monitor the speed of the motor 2 in an operation control pattern and an operation monitor pattern according to the safety limited speed monitor function SLS. In the embodiment illustrated in FIG. 12, when the speed of the motor 2 exceeds the monitor speed s2 after predetermined time t3 has elapsed since the input of the safety request signal, the safety function unit A turns into "Fault Out" state. That is, the safety function unit A outputs an excessive state occurrence time trigger as a monitor result signal to stop functioning. In the above-described example of setting, the excessive state occurrence time trigger is output to the fifth output destination (SO5) for the safety controller 12, while another excessive state occurrence time trigger output from FO is input, as a safety request signal, into the safety function unit B.

This causes the safety function unit B to function, in place of the safety function unit A, to control and monitor the speed and rotational angle of the motor 2 in an operation control pattern and an operation monitor pattern according to the safe position monitor function SS2. In the embodiment illustrated in FIG. 12, when the relative angle of the motor 2 exceeds the monitor displacement p1 after the motor 2 has stopped, the safety function unit B turns into "Fault Out" state, outputting a monitor result signal to the HWBB 32 as an activation signal. The activation signal causes feeding of electric power to the motor 2 to stop, which is STO state (motor stopping). As seen from the above-described example of setting, in this embodiment, the monitor result obtained by the safety function unit A is selected as the input source of the safety request signal for the predetermined safety function unit B. Thus, sequential control switching from the safety function unit A to the safety function unit B is implemented. In another possible embodiment, not illustrated, the monitor result obtained by the safety function unit B may be selected as the input source of the safety request signal for each of the other safety function units C to J. Thus, triple or more than triple sequential control is implemented.

Advantageous Effects of this Embodiment

As has been described hereinbefore, the motor control system 1 according to this embodiment includes the motor controller 13. The motor controller 13 includes a plurality of safety function units configured to function simultaneously with each other. Each of the plurality of safety function units is configured to, upon input of a safety request signal from outside the motor controller 34, monitor a relationship between a driving state quantity of the motor 2 and an operation monitor pattern selected from a plurality of kinds of operation monitor patterns. This configuration provides each safety function unit with a higher degree of freedom to determine which operation monitor pattern to apply. This configuration, as a result, improves the versatility of the safety functions of the motor control system 1. Since the plurality of safety function units are capable of functioning simultaneously with each other, the operation control of the motor 2 and the driven machine 4 can be monitored in a variety of combinations of operation patterns selected as desired from a plurality of operation monitor patterns. This configuration further improves the versatility of the safety functions of the motor control system 1.

Also in this embodiment, each safety function unit is capable of selecting the input source of the safety request signal. This configuration ensures that the kind of the input source of the safety request signal (the safety controller 12, the communication controller 15, or another safety function unit) and an identification of the input source (such as 1, 2, 3, 4, and 5) can be selected as desired. This configuration, in turn, enables a wider variety of objects to be monitored for safety detection, and thus further improves the versatility of the safety functions of the motor control system 1.

Also in this embodiment, one safety function unit (the safety function unit B in the above-described example of setting) is capable of selecting, as an input source, another safety function unit (the safety function unit A in the above-described example of setting) and receiving, as a safety request signal, a monitor result obtained by the another safety function unit (the safety function unit A in the above-described example of setting). This configuration ensures sequential monitoring using a plurality of operation monitor patterns. For example, when, in the another safety function unit, the driving state quantity exceeds the operation monitor pattern (that is, in the case of "Fault"), the one safety function unit performs comparison monitoring in a different operation monitor pattern. This configuration further improves the versatility of the safety functions of the motor control system 1.

Also in this embodiment, each safety function unit is capable of selecting a destination to which the monitor result obtained by the safety function unit is to be output. This configuration ensures that the kind of the output destination of the monitor result (the HWBB 32, the safety controller 12, or the communication controller 15) and an identification of the output destination (such as 1, 2, 3, 4, and 5) can be selected as desired for purposes other than stopping feeding of electric power to the motor 2. This configuration, in turn, enables a wider variety of notification focus to be implemented, and thus further improves the versatility of the safety functions of the motor control system 1.

Also in this embodiment, the motor controller 13 includes the HWBB 32. Upon input of an HWBB activation signal from a safety function unit, the HWBB 32 stops feeding of electric power to the motor 2. This configuration ensures that when, in a safety function unit, the driving state quantity exceeds the operation monitor pattern (that is, in the case of "Fault"), the motor 2 is controlled to decelerate and/or stop in a safest and most reliable manner.

Also in this embodiment, each safety function unit is capable of selecting an operation monitor pattern (SSB or STO operation monitor pattern) that outputs an HWBB activation signal to the HWBB 32 immediately after input of the safety request signal. This configuration ensures that a necessary operation to control the motor 2 to decelerate and/or stop in a safest and most reliable manner is as simple as inputting a safety request signal. In this configuration, it is not necessary to input the driving state quantity of the motor 2. It will be understood that other operation patterns (such as SS1, SOS, and SLA) that are specified in the above-described safety standards and not elaborated in this embodiment may also be used as operation monitor patterns in this embodiment.

Also in this embodiment, each safety function unit is capable of selecting a destination to which a monitor result obtained by the safety function unit is to be output, capable of making the monitor result an HWBB activation signal, and capable of selecting the HWBB 32 as the output destination of the HWBB activation signal. This configuration ensures that when, in a safety function unit, the driving state quantity exceeds the operation monitor pattern (that is, in the case of "Fault"), the motor 2 is controlled to decelerate and/or stop in a safest and most reliable manner.

Also in this embodiment, each operation monitor pattern is a time-series change pattern changeable upon input of the safety request signal. This configuration enables each operation monitor pattern to change with time at the input timing of the corresponding safety request signal. In particular, in a combination of a plurality of operation monitor patterns used in a plurality of safety function units, functional comparison monitoring is implemented using a driving state quantity.

In another possible embodiment, not illustrated, the plurality of safety function units may select the same input source of safety request signals. This configuration enables the plurality of safety function units to function in parallel to each other and simultaneously with each other. In this configuration, an operation control pattern and an operation monitor pattern corresponding to each other may be processed in parallel to each other and independently of each other, and then a combination of results of the processings may be used to generate a deceleration control command or used as a target of comparison monitoring. When, in particular, safety is prioritized, a change value of the operation control pattern that is lowest at the present point of time and a change value of the operation monitor pattern that is lowest at the present point of time may be used to generate a deceleration control command or used as a target of comparison monitoring.

As used herein, the terms "perpendicular", "parallel", and "plane" may not necessarily mean "perpendicular", "parallel", and "plane", respectively, in a strict sense. Specifically, the terms "perpendicular", "parallel", and "plane" mean "approximately perpendicular", "approximately parallel", and "approximately plane", respectively, with design-related and production-related tolerance and error taken into consideration.

Also, when the terms "simultaneously", "identical", "same", "equivalent", and "different" are used in the context of dimensions, magnitudes, sizes, or positions, these terms may not necessarily mean "simultaneously", "identical", "same", "equivalent", and "different", respectively, in a strict sense. Specifically, the terms "simultaneously", "identical", "same", "equivalent", and "different" mean "approximately simultaneously", "approximately identical", "approximately same", "approximately equivalent", and "approximately different", respectively, with design-related and production-related tolerance and error taken into consideration.

Otherwise, the above-described embodiments and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A motor control system, comprising:
   a motor; and
   motor control circuitry configured to
   control driving electric power for the motor based on a received driving state quantity of the motor, and
   upon input of a plurality of safety request signals from outside the motor control circuitry, simultaneously monitor a relationship between the received driving state quantity and the respective operation monitor pattern, each operation monitor pattern selected from a plurality of kinds of operation monitor patterns stored in a memory based on the respective safety request signal of the plurality of safety request signals, using a plurality of simultaneously functioning safety function software modules.

2. The motor control system according to claim 1, wherein the motor control circuitry is configured to select an input source of the respective safety request signal.

3. The motor control system according to claim 2, wherein the motor control circuitry is configured to select a safety function software module of the safety function software modules as the input source and is configured to receive, as the respective safety request signal, a monitor result obtained by the safety function software module.

4. The motor control system according to claim 1, wherein the motor control circuitry is configured to select a destination to which each of the safety function software modules outputs a respective monitor result.

5. The motor control system according to claim 1, wherein the motor control circuitry is configured to stop the driving electric power from being fed to the motor, using a feeding stopper software module, when a feeding stopping signal is generated from a first safety function software module among the plurality of safety function software modules.

6. The motor control system according to claim 5, wherein motor control circuitry is configured to select the operation monitor pattern, among the plurality of kinds of operation monitor patterns, that results in the feeding stopping signal being generated immediately after receipt of the safety request signal.

7. The motor control system according to claim 5, wherein the motor control circuitry is configured to select the feeding stopper software module as a destination to which the first safety function software module outputs, as the feeding stopping signal, the monitor result obtained by the first safety function software module.

8. The motor control system according to claim 1, wherein each of the kinds of operation monitor patterns includes a time-series change pattern changeable upon input of the respective safety request signal.

9. The motor control system according to claim 2, wherein the motor control circuitry is configured to select a destination to which each of the safety function software modules outputs a respective monitor result.

10. The motor control system according to claim 2, wherein the motor control circuitry is configured to stop the driving electric power from being fed to the motor, using a feeding stopper software module, when a feeding stopping signal is generated from a first safety function software module among the plurality of safety function software modules.

11. The motor control system according to claim 4, wherein the motor control circuitry is configured to stop the driving electric power from being fed to the motor, using a feeding stopper software module, when a feeding stopping signal is generated from a first safety function software module among the plurality of safety function software modules.

12. The motor control system according to claim 9, wherein the motor control circuitry is configured to stop the driving electric power from being fed to the motor, using a feeding stopper software module, when a feeding stopping signal is generated from a first safety function software module among the plurality of safety function software modules.

13. The motor control system according to claim 8, wherein the motor control circuitry is configured to stop the driving electric power from being fed to the motor, using a feeding stopper software module, when a feeding stopping signal is generated from a first safety function software module among the plurality of safety function software modules.

14. The motor control system according to claim 10, wherein the motor control circuitry is configured to select the operation monitor pattern, among the plurality of kinds of operation monitor patterns, that results in the feeding stopping signal being generated immediately after receipt of the safety request signal.

15. The motor control system according to claim 12, wherein the motor control circuitry is configured to select the operation monitor pattern, among the plurality of kinds of operation monitor patterns, that results in the feeding stopping signal being generated immediately after receipt of the safety request signal.

16. The motor control system according to claim 11, wherein motor control circuitry is configured to select the operation monitor pattern, among the plurality of kinds of operation monitor patterns, that results in the feeding stopping signal being generated immediately after receipt of the safety request signal.

17. The motor control system according to claim 1, wherein the driving state quantity of the motor is generated from an encoder mechanically connected to the motor.

18. The motor control system according to claim 17, wherein each safety request signal input from outside the motor control circuitry is generated by safety control circuitry reading information from sensors disposed in a driven machine connected to the motor.

19. A motor control apparatus, comprising:
control circuitry that controls driving of electric power for a motor and is configured to,
upon input of a plurality of safety request signals indicating whether to decelerate and/or stop the motor, simultaneously monitor a relationship between a received driving state quantity and the respective operation monitor pattern, each operation monitor pattern selected from a plurality of kinds of operation monitor patterns stored in a memory based on the respective safety request signal of the plurality of safety request signals, using a plurality of simultaneously functioning safety function software modules.

20. A method for controlling a motor, comprising:
selecting, using motor control circuitry, an operation monitor pattern from a plurality of kinds of operation monitor patterns stored in a memory;
and
inputting, using the motor control circuitry, a monitor result obtained by a first safety function software module among a plurality of simultaneously functioning safety function software modules into a second safety function software module among the plurality of safety function software modules,
wherein the motor is controlled using the motor control circuitry driving electric power for the motor that is configured to, upon input of a plurality of safety request signals indicating whether to decelerate and/or stop the motor, simultaneously monitor a relationship between a driving state quantity and the respective operation monitor pattern, each operation monitor pattern selected from a plurality of kinds of operation monitor patterns stored in a memory based on the respective safety request signal of the plurality of safety request signals, using the plurality of simultaneously functioning safety function software modules.

* * * * *